United States Patent [19]
Willming

[11] Patent Number: 5,923,711
[45] Date of Patent: Jul. 13, 1999

[54] SLICE PREDICTOR FOR A SIGNAL RECEIVER

[75] Inventor: David A. Willming, Palatine, Ill.

[73] Assignee: Zenith Electronics Corporation, Glenview, Ill.

[21] Appl. No.: 08/627,826

[22] Filed: Apr. 2, 1996

[51] Int. Cl.[6] .............................. H04L 25/34; H04L 25/06
[52] U.S. Cl. ......................... 375/287; 375/317; 375/286
[58] Field of Search .................................... 375/286, 287, 375/261, 262, 264, 241, 317, 247, 302, 320, 341

[56] References Cited

U.S. PATENT DOCUMENTS

| | | | |
|---|---|---|---|
| 4,447,908 | 5/1984 | Chevillat et al. | 375/262 |
| 4,553,102 | 11/1985 | Yoshida | 375/317 |
| 4,748,626 | 5/1988 | Wong | 375/286 |
| 5,086,340 | 2/1992 | Citta et al. | 358/141 |
| 5,105,442 | 4/1992 | Wei | 375/262 |
| 5,410,569 | 4/1995 | Halozan | 375/286 |
| 5,438,593 | 8/1995 | Karam et al. | 375/317 |
| 5,483,289 | 1/1996 | Urade et al. | 375/317 |
| 5,574,751 | 11/1996 | Trelewicz et al. | 375/265 |
| 5,583,889 | 12/1996 | Citta et al. | 375/341 |
| 5,600,677 | 2/1997 | Citta et al. | 375/296 |
| 5,684,834 | 11/1997 | Betts et al. | 375/261 |

*Primary Examiner*—Chi H. Pham
*Assistant Examiner*—Khai Tran

[57] ABSTRACT

The disclosed data processor develops a data signal which has a plurality of multi-level symbols. The data processor, in response to each of the symbols, determines the lowest path metric characterizing the data signal, and selects one of a plurality of sets of slice values in response to the lowest path metric. A slicer responds to the selected set of slice values by slicing the multi-level symbols. There may be only two sets of slice values in the plurality of sets of slice values, wherein each of the only two sets has three slice levels. Alternatively, there may be only five sets of slice values in the plurality of sets of slice values, wherein each of the only five sets has five slice levels. As a still further alternative, there may be only two sets of slice values in the plurality of sets of slice values, wherein each of the only two sets has a minimum of six slice levels.

38 Claims, 7 Drawing Sheets

| A Relative Amplitude | B Symbol Levels | C $Z_2Z_1Z_0$ | D Symbol Subset | E Slice Levels | F Slice Levels a/c | G Slice Levels b/d |
|---|---|---|---|---|---|---|
| -7 | — | 000 | d | 000 | 001 | 000 |
| -5 | — | 001 | c | 001 |  |  |
| -3 | — | 010 | b | 010 | 011 | 010 |
| -1 | — | 011 | a | 011 |  |  |
| +1 | — | 100 | d | 100 | 101 | 100 |
| +3 | — | 101 | c | 101 |  |  |
| +5 | — | 110 | b | 110 | 111 | 110 |
| +7 | — | 111 | a | 111 |  |  |

Fig. 5

| $Q_1Q_0$ (n) | $Y_2Y_1$ (n) | $Z_2Z_1Z_0$ (n) | S (n) | R (n) | $Q_1Q_0$ (n+1) |
|---|---|---|---|---|---|
| 00 | 00 | 000 | d | -7 | 00 |
| 00 | 01 | 010 | b | -3 | 01 |
| 00 | 10 | 100 | d | +1 | 00 |
| 00 | 11 | 110 | b | +5 | 01 |
| 01 | 00 | 001 | c | -5 | 10 |
| 01 | 01 | 011 | a | -1 | 11 |
| 01 | 10 | 101 | c | +3 | 10 |
| 01 | 11 | 111 | a | +7 | 11 |
| 10 | 00 | 000 | d | -7 | 01 |
| 10 | 01 | 010 | b | -3 | 00 |
| 10 | 10 | 100 | d | +1 | 01 |
| 10 | 11 | 110 | b | +5 | 00 |
| 11 | 00 | 001 | c | -5 | 11 |
| 11 | 01 | 011 | a | -1 | 10 |
| 11 | 10 | 101 | c | +3 | 11 |
| 11 | 11 | 111 | a | +7 | 10 |

SLICE PREDICTOR FOR A SIGNAL RECEIVER

TECHNICAL FIELD OF THE INVENTION

The present invention relates to a slicing arrangement for slicing multi-level signals which are transmitted and received in a data transmission and reception system.

BACKGROUND OF THE INVENTION

Multi-level modulation, such as the modulation produced by trellis encoders, is a well-known technique for improving the performance of a data transmission and reception system. For example, multi-level modulation results in an improvement in the signal-to-noise (S/N) performance of the data transmission and reception system at a given power level. Alternatively, multi-level modulation permits the transmitted power level required to achieve a given signal-to-noise performance to be reduced.

In essence, trellis-coded modulation (TCM) comprises the use of a multi-state convolution encoder to convert each k input data bits of an input sequence of data bits into k+n output data bits, and is therefore referred to as a rate k/(k+n) convolution encoder. The output bits are then mapped into a sequence of discrete multi-level symbols of a modulated carrier for data transmission. Each multi-level symbol typically has one of $2^{(k+n)}$ values. These values can be phase and/or amplitude values. By coding the input data bits in a state-dependent sequential manner, increased minimum Euclidean distances between the allowable transmitted sequences may be achieved leading to a reduced error probability where a maximum likelihood decoder (for example, a Viterbi decoder) is used in the receiver.

In an example of a data transmission and reception system which uses multi-level modulation, successive pairs of data bits $X_1$, $X_2$ are encoded for transmission as eight-level, one-dimensional symbols. More specifically, bit $X_1$ is convolutionally encoded using a four-state convolution encoder to generate bits $Z_0$, $Z_1$, and bit $X_2$ is precoded to generate bit $Z_2$. Bits $Z_2$, $Z_1$, and $Z_0$ are mapped to respective eight-level symbols using a one-dimensional symbol constellation. As an example, $2^{(k+n)}$ amplitude values of −7, −5, −3, −1, +1, +3, +5, and +7 may be used for the one-dimensional symbol constellation. The eight-level symbols, after insertion of appropriate sync signals, are transmitted in the form of a suppressed carrier vestigial sideband (VSB) signal.

This signal is received by a receiver which, at the front end, may include a tuner, an IF demodulator, an analog-to-digital (A/D) converter, a channel equalizer, and a decoder. The decoder decodes the multi-level symbols in order to recover the successive pairs of data bits $X_1$, $X_2$. The receiver may also include a phase tracker to reduce phase noise errors and amplitude-related errors. That is, many signal receivers, such as television receivers, which are used in data transmission and reception systems and which are designed for receiving suppressed carrier VSB signals, use a double conversion tuner at the receiver front end. The first local oscillator of such a tuner typically exhibits a relatively high level of phase noise in the demodulated data. In addition, the demodulated data may be degraded by amplitude-related errors resulting in the demodulated data being recovered with undesired offsets and/or at undesired levels of gain. These phase noise errors and amplitude-related errors may lead to an unacceptable error rate if uncorrected, especially in the case of tightly packed data constellations. In order to minimize the error rate due to phase noise errors and amplitude-related errors, the multi-level symbols may be processed by a phase tracker. An example of such a phase tracker is disclosed in U.S. Pat. No. 5,406,587.

Circuits, such as equalizers and phase trackers, usually compute a sliced data signal from a continuous valued signal. The conventional slicer slices the eight-level symbols in accordance with a set of seven slice levels to produce one of eight quantized output values. While this approach to slicing is perfectly satisfactory in theory, performance of the conventional slicer is usually degraded under noisy conditions which cause the amplitude of a multi-level symbol level to cross a slice level solely due to noise acquired during transmission and reception.

For example, the amplitude of a symbol originally having a value of +5 (using the −7, −5, −3, −1, +1, +3, +5, +7 constellation described above) may be degraded by noise such that its value at the output of the phase tracker may be +6.1. Accordingly, a slicing system, which slices the received signal at −6, −4, −2, 0, +2, +4, and +6 will produce an incorrect quantized value of +7 rather than the proper quantized value of +5 for use by the phase tracker.

The present invention solves one or more of the above described problems.

SUMMARY OF THE INVENTION

In accordance with one aspect of the present invention, a data processor comprises a receiving means, a selecting means, and a slicing means. The receiving means receives a plurality of multi-level symbols. The selecting means selects one of a plurality of sets of slice values, wherein each set of slice values has a minimum of three slice values. The slicing means slices the multi-level symbols in response to the selected set of slice values.

In accordance with another aspect of the present invention, a data processor comprises a receiving means, a selecting means, and a slicing means. The receiving means receives a plurality of multi-level symbols. The selecting means selects one of only two sets of slice values, wherein each of the only two sets of slice values has a plurality of slice values. The slicing means slices the multi-level symbols in response to the selected set of slice values.

In accordance with yet another aspect of the present invention, a data processor comprises a receiving means, a selecting means, and a slicing means. The receiving means receives a plurality of multi-level symbols. The selecting means selects one of only five sets of slice values, wherein each of the only five sets of slice values has a plurality of slice values. The slicing means slices the multi-level symbols in response to the selected set of slice values.

In accordance with a further aspect of the present invention, a data processor comprises a developing means, a determining means, a selecting means, and a slicing means. The developing means develops a data signal including a plurality of multi-level symbols. The determining means is responsive to each of the multi-level symbols in order to determine a lowest path metric characterizing the data signal. The selecting means selects one of a plurality of sets of slice values in response to the lowest path metric. The slicing means slices the multi-level symbols in response to the selected set of slice values.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
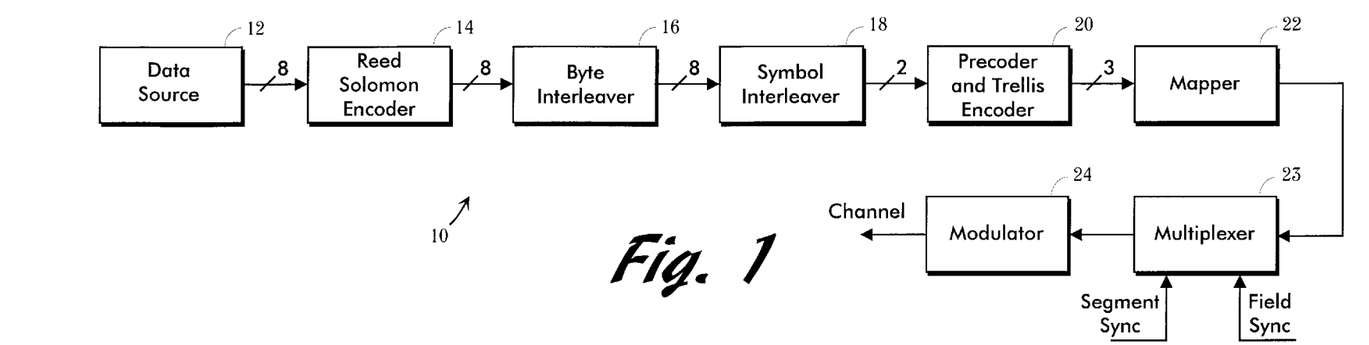
FIG. 1 is a block diagram of a transmitter which is useful in a multi-level symbol data transmission and reception system and which includes a precoder and trellis encoder.
Figure 2:
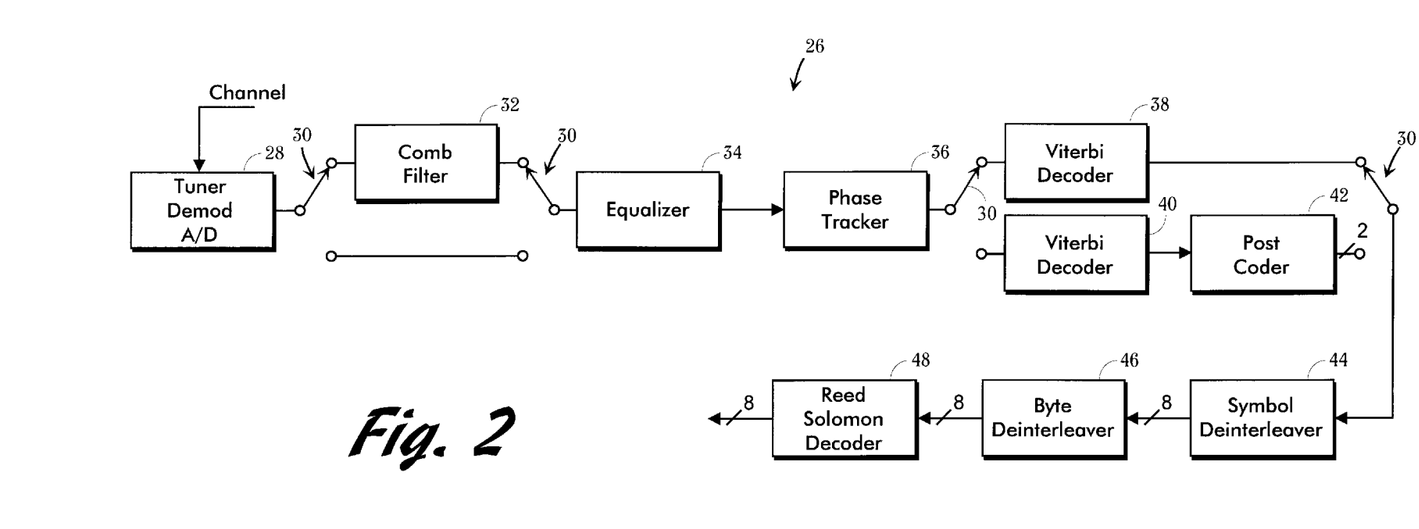
FIG. 2 is a block diagram of a receiver which is useful in a multi-level symbol data transmission and reception system and which includes a channel equalizer and a phase tracker.

FIGS. 1 and 2 generally illustrate a multi-level symbol data transmission and reception system as applied to a multi-level VSB high definition television (HDTV) transmission and reception system of the type disclosed in U.S. Pat. No. 5,087,975 and in copending patent application Ser. No. 08/272,181, filed on Jul. 8, 1994, the disclosures of which are incorporated herein by reference. However, while the multi-level VSB HDTV application is contemplated in the preferred embodiment of the present invention, it will be understood that the present invention is more general in nature and, thus, may be applied to other types of transmission and reception systems, including lower resolution video systems as well as non-video based data systems.

Accordingly, as shown in FIG. 1, a transmitter 10 of a multi-level symbol data transmission and reception system includes a data source 12 which provides a succession of data bytes and a plurality of timing signals. The data bytes, for example, may include eight bits per byte and may comprise a compressed HDTV signal, a compressed television signal of NTSC resolution, or any other data signal.

The data bytes are preferably, although not necessarily, arranged in successive fields. Each field includes a field segment and 312 field sync and data segments, and each field sync and data segment comprises 828 eight-level symbols and four two-level data segment sync symbols occurring at a symbol rate of about 10.76 Msymbols/sec. The data bytes from the data source 12 are applied to a Reed Solomon encoder 14 for forward error correction coding, and then to a byte interleaver 16. The byte interleaver 16 reorders the data bytes throughout a frame to reduce the susceptibility of the multi-level symbol data transmission and reception system to burst noise.

The interleaved data bytes from the byte interleaver 16 are applied to a symbol interleaver 18 which provides, for example, two output bit streams $X_1$ and $X_2$ at the symbol rate. As disclosed, each bit pair $X_1$, $X_2$ is converted to a corresponding multi-level symbol. In particular, due to the presence of a comb filter in the receiver (to be described in more detail hereinafter), it is desirable to interleave the bit pairs $X_1$, $X_2$ of each data segment among twelve subsegments. Therefore, each subsegment comprises, for example, 69 symbols. This symbol interleaving is discussed in more detail in the aforementioned 181 application.

The stream of bit pairs $X_1$, $X_2$ from the symbol interleaver 18 is coupled to a precoder and trellis encoder 20 for conversion to three output bits as described in further detail hereinafter. Because the precoder and trellis encoder 20 is characterized by a twelve-symbol delay, the precoder and trellis encoder 20 may be envisioned as comprising twelve parallel encoders each operating at $\frac{1}{12}$ of the symbol clock rate such that each subsegment generated by the symbol interleaver 18 is processed by a respective one of twelve parallel encoders. The stream of three-bit output bits developed at the output of the precoder and trellis encoder 20 is applied to a symbol mapper 22 and therefrom to a multiplexer 23. The multiplexer 23 multiplexes the output of the mapper 22 with a field sync symbol and a segment sync symbol. The field sync symbol and the segment sync symbol provide field structure. The symbols mapped by the mapper 22, the field sync symbol, and the segment sync symbol, which are multiplexed by the multiplexer 23, are connected to a VSB modulator 24 for transmission as a plurality of multi-level symbols.

As shown in FIG. 2, a receiver 26 of the multi-level symbol data transmission and reception system receives the signal transmitted by the VSB modulator 24 and includes a tuner, demodulator, and A/D converter 28. The tuner, demodulator, and A/D converter 28 tunes a desired channel, converts the received and tuned signal to an intermediate frequency signal, demodulates the intermediate frequency signal to a baseband analog signal, and converts the baseband analog signal to a digital signal for further processing. This digital signal comprises the stream of multi-bit, multi-level symbols which are transmitted by the transmitter 10, and is applied by a multiple pole switch 30 to first and second signal processing paths.

The first signal processing path comprises a comb filter 32, a channel equalizer 34, a phase tracker 36, and a Viterbi decoder 35. The second signal processing path comprises the channel equalizer 34, the phase tracker 36, a Viterbi decoder 40, and a post coder 42. The output of the Viterbi decoder 35, or the output of the post coder 42, is connected to a symbol deinterleaver 44, a byte deinterleaver 46, and a Reed Solomon decoder 48. The output of the Reed Solomon decoder 48 is further processed by elements of the receiver 26 not shown. The comb filter 32 may comprise a feed forward filter including a linear summer and a twelve-symbol delay element.

The reason for these different first and second signal processing paths is because of the possibility of co-channel interference. That is, as explained in more detail in the previously mentioned '975 patent, the comb filter 32 is operable for reducing NTSC co-channel interference by subtracting from each received symbol, the symbol received twelve-symbol intervals earlier. Because of the symbol interleaving provided in the transmitter, the comb filter 32 independently operates on each of the twelve subsegments of a data segment for providing successive combed outputs of the form $A_1-A_0, B_1-B_0, \ldots A_2-A_1, B_2-B_1, \ldots A_{56}-A_{55}, B_{56}-B_{55}, \ldots$.

The comb filter 32 is desirable in those regions which may receive both HDTV digital signals and standard NTSC signals. For some period of time, at least some of the same broadcast channels in adjacent or nearby television service areas are likely to be allocated for both NTSC transmissions and HDTV transmissions. This overlapping allocation may result in co-channel interference where HDTV and NTSC transmissions in nearby or adjacent television service areas occur on the same channel. The comb filter 32 is thus intended to reduce NTSC co-channel interference from a received HDTV signal. Accordingly, if the receiver 26 is used in such a service area, the multiple pole switch 30 is operated to process the output from the tuner, demodulator, and A/D converter 28 along the first path which includes the comb filter 32 and the Viterbi decoder 35. If the receiver 26 is not used in such a service area, the output of the tuner, demodulator, and A/D converter 28 may be processed along the second path which bypasses the comb filter 32 and the Viterbi decoder 35 and instead processes the signals using the Viterbi decoder 40 and the post coder 42. The processing along the second path is simpler because the comb filter 32 doubles the complexity of processing the received data signals.

Figure 3:
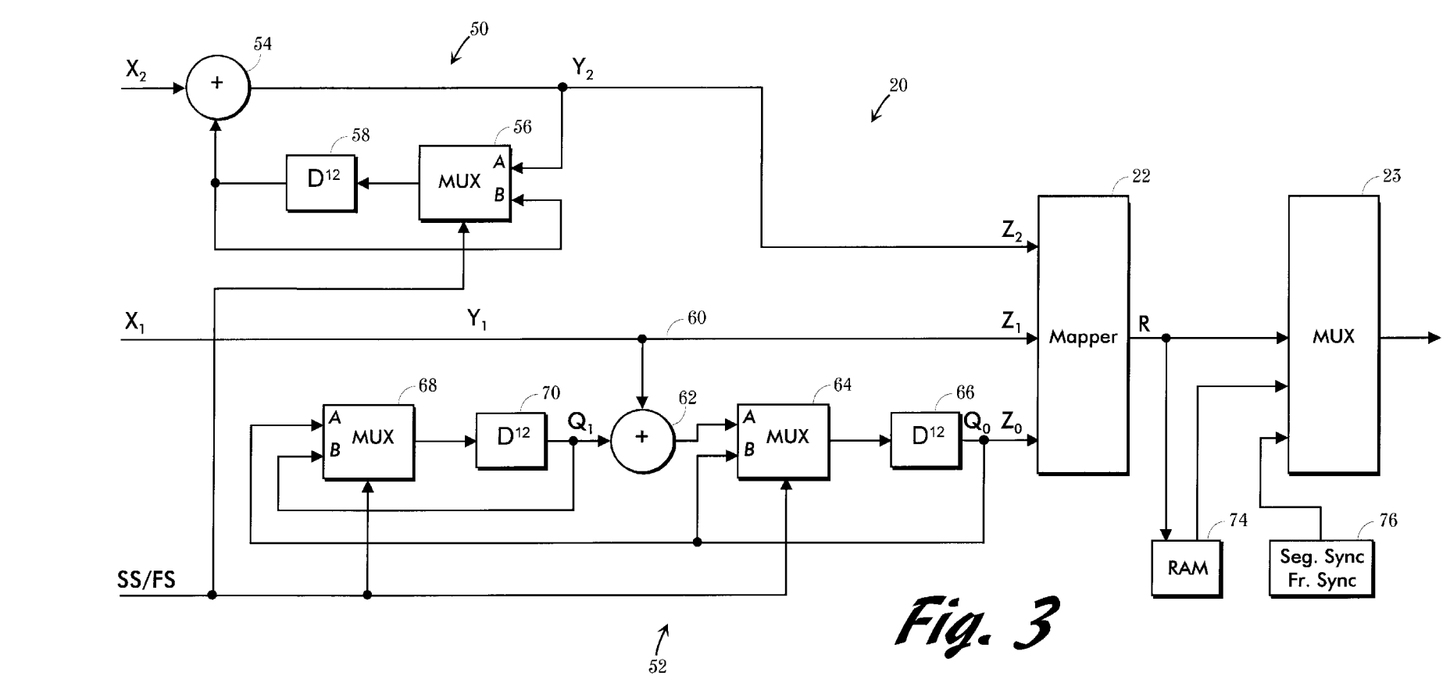
FIG. 3 is a block diagram illustrating the precoder and trellis encoder of FIG. 1.

As shown in FIG. 3, the precoder and trellis encoder 20 includes a precoder 50 and a trellis encoder 52. The precoder 50 is a modulo-2, feedback precoder which receives the multi-level symbols (each symbol being identified as bits $X_1$ and $X_2$) from the symbol interleaver 18, and develops intermediate bits $Y_1, Y_2$. More specifically, the precoder 50 includes a modulo-2 summer 54 having a first input connected to receive the bit $X_2$. The output of the modulo-2 summer 54 provides the intermediate bit $Y_2$ and is connected to a first (A) input of a multiplexer 56 having an output connected to a twelve-symbol delay element 58. The output of the twelve-symbol delay element 58 is connected to a second input of the modulo-2 summer 54 and is also connected to a second (B) input of the multiplexer 56. The intermediate bit $Y_2$ generated by the precoder 50 is applied as an output bit $Z_2$ to a first input of the symbol mapper 22. The intermediate bit $Y_1$ is an uncoded form of the bit $X_1$ and is supplied to the trellis encoder 52.

The trellis encoder 52 comprises a rate ½, 4-state systematic feedback convolution encoder which converts the intermediate bit $Y_1$ to the output bits $Z_1$ and $Z_0$. Accordingly, the trellis encoder 52 includes a signal path 60 for applying the intermediate bit $Y_1$ as the output bit $Z_1$ directly to a second input of the symbol mapper 22. Also, the trellis encoder 52 includes a modulo-2 summer 62 which receives the intermediate bit $Y_1$ from the signal path 60 at a first input thereof. The modulo-2 summer 62 has an output connected to a first (A) input of a multiplexer 64, the output of which is connected to a twelve-symbol delay element 66. The output of the twelve-symbol delay element 66 is connected to the symbol mapper 22, to a second (B) input of the multiplexer 64, and to a first (A) input of a multiplexer 68. The twelve-symbol delay element 66 produces a state bit $Q_0$, which is used to define a state of the trellis encoder 52 at a particular time and which is provided as the output bit $Z_0$. The output of the multiplexer 68 is connected to a twelve-symbol delay element 70 and produces a state bit $Q_1$, which is also used to define the state of the trellis encoder 52 at the particular time. The output of the twelve-symbol delay element 70 is connected as a second input to the modulo-2 summer 62 and is fed back to a second (B) input of the multiplexer 68. Because of the twelve-symbol delay elements 58, 66, and 70, each subsegment of a data segment is independently processed by the precoder 50 and the trellis encoder 52. The multiplexers 56, 64, and 68 are provided to allow for sync insertion during which times their respective second (B) inputs are selected. At all other times, the first (A) inputs of the multiplexers 56, 64, and 68 are selected.

Figure 5:
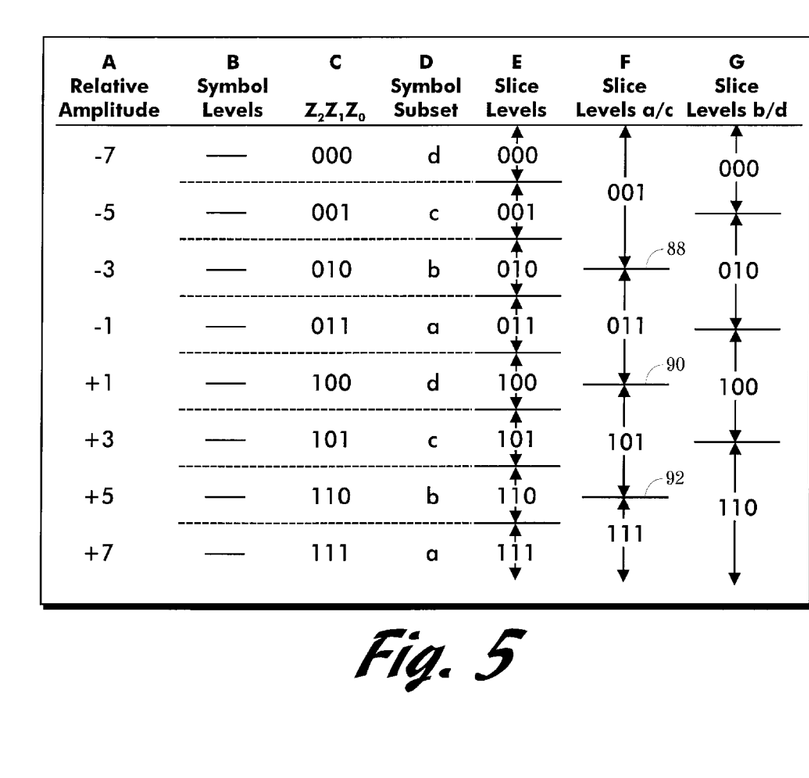
FIG. 5 illustrates two sets of slice levels for the slicer shown in FIG. 4 in the case where a comb filter is not used in the receiver of a multi-level symbol data transmission and reception system.

The output bits $Z_2, Z_1$, and $Z_0$ are supplied to the symbol mapper 22. The symbol mapper 22 maps these three output bits to a corresponding one of eight signal levels to form a multi-level symbol. These eight signal levels are shown in Columns A and B of FIG. 5. Column C of FIG. 5 shows the various combinations of the output bits $Z_2, Z_1, Z_0$. For example, if $Z_2=0, Z_1=1$, and $Z_0=1$, the mapper 22 maps output bits $Z_2, Z_1$, and $Z_0$ to a multi-level symbol of −1. As can be seen from FIG. 5, the eight-level symbols developed at the output of the symbol mapper 22 are symmetrical about the zero level. To facilitate signal acquisition by the receiver 26, it is preferable to offset each symbol by a given amount (for example, +1 unit) in order to provide a pilot component. The multi-level symbols, and the pilot component if used, are then applied through a first input of a multiplexer 23 to the VSB modulator 24. The VSB modulator 24 modulates the multi-level symbols (and the pilot component) on a selected carrier for transmission in a suppressed carrier VSB form as described in the previously mentioned '975 patent. The output of the symbol mapper 22 is also applied to the input of a RAM 74 whose output is supplied to a second input of the multiplexer 23. A third input of the multiplexer 23 is supplied from a source 76 of segment and frame sync signals.

Also, as shown in FIG. 5, the eight levels of the multi-level symbols are divided into four subsets a, b, c, and d. Each of these four subsets is identified by a particular state of the output bits $Z_1, Z_0$. Thus, when the output bits $Z_1, Z_0$ are in state 00, their state corresponds to subset d; when the output bits $Z_1, Z_0$ are in state 01, their state corresponds to subset c; when the output bits $Z_1, Z_0$ are in state 10, their state corresponds to subset b; and, when the output bits $Z_1, Z_0$ are in state 11, their state corresponds to subset a.

Figure 4:
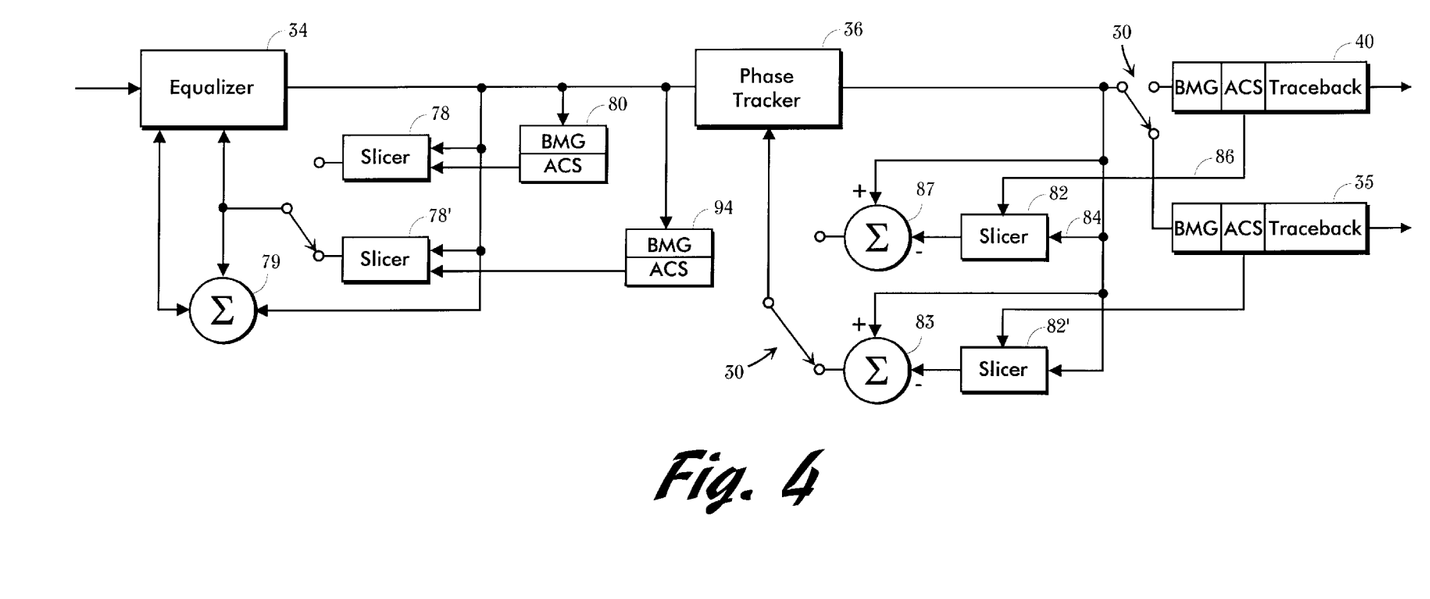
FIG. 4 is a slicing arrangement which implements the present invention and which is useful with the channel equalizer and the phase tracker of FIG. 2.

FIG. 4 illustrates a modification of a portion of the receiver 26 shown in FIG. 2 according to the present invention. As illustrated in FIG. 4, the stream of received multi-level symbols (at a rate equal to 10.76 MHz) representing the output bits $Z_2, Z_1, Z_0$ is provided to the channel equalizer 34. The multi-level symbols are equalized by the channel equalizer 34, and are then processed by the phase tracker 36 to remove undesired phase noise. The phase tracker 36 may be of the type disclosed in the aforementioned '587 patent.

When processing by the comb filter 32 is not necessary, the output of the phase tracker 36 is connected through a pole of the multiple pole switch 30 to the Viterbi decoder 40 to derive an estimation of the original data bits $X_1, X_2$. As discussed in the aforementioned 181 application, a Viterbi decoder, such as a Viterbi decoder manufactured by LSI Logic Corp., includes a branch metric generator (BMG) which is responsive to the received multi-level symbols for generating and for applying branch metrics to an add, compare, and select (ACS) unit. The ACS unit is bi-directionally coupled to a path metric storage memory (not shown) and also supplies a traceback memory.

The ACS unit of a Viterbi decoder is responsive to the branch metrics generated by the BMG for generating a plurality of path metrics for each multi-level symbol. Each path metric corresponds to a selected state of a convolution encoder. The convolutional encoder used in the present invention (i.e., the trellis encoder 52) has four states as shown by the $Q_1Q_0(n)$ column of the state table shown in FIG. 6. Each of these four states is repeated four times because of the four possible states of the intermediate bits $Y_1$, $Y_2$ shown in the $Y_2Y_1(n)$ column of FIG. 6. The $Z_2Z_1Z_0(n)$ column is derived from the $Q_1Q_0(n)$ column and the $Y_2Y_1(n)$ column. That is, as shown in FIG. 3, the output bit $Z_2$ is always equal to the intermediate bit $Y_2$, the output bit $Z_1$ is always equal to the intermediate bit $Y_1$, and the output bit $Z_0$ is always equal to the state bit $Q_0$. The subset(n) column shows in which of the four subsets {a, b, c, or d} a point lies. The R(n) column is determined by mapping of the $Z_2$, $Z_1$, $Z_0$ bits to an output data level. The next state $Q_1Q_0(n+1)$ is defined by the combination of the current state $Q_1Q_0(n)$ and the current input bit $Y_1(n)$.

Figure 6:
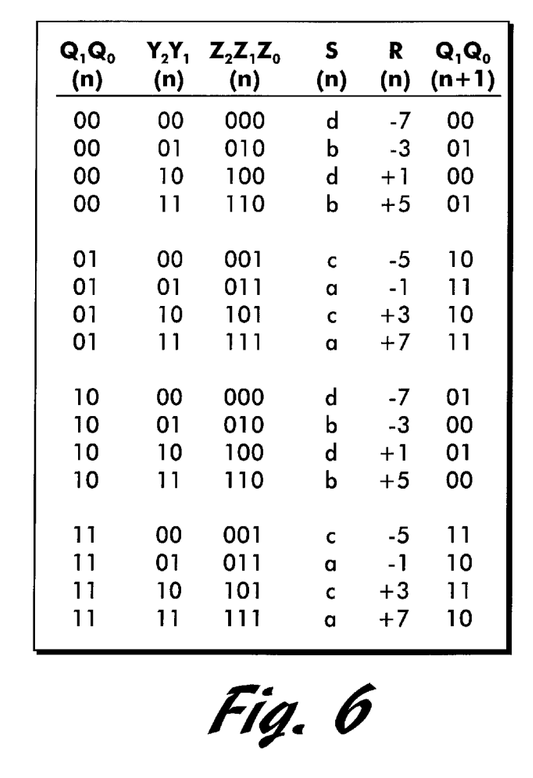
FIG. 6 is a state table illustrating the operation of the trellis encoding process.
Figure 7:
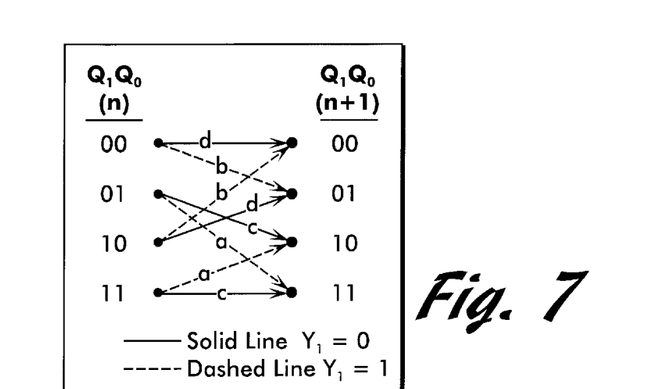
FIG. 7 is a trellis diagram for the trellis encoder of FIG. 3 and is based upon FIG. 6.

The information in the state table of FIG. 6 may also be represented by the trellis diagram of FIG. 7. As shown therein, the four path metrics maintained by the ACS unit correspond to the four encoder states. As shown in FIGS. 5, 6, and 7, when the encoder is in state 00 or state 10, the symbol output during the current symbol period lies in either subset b or subset d, and when the encoder is in state 01 or state 11, the symbol output during the current symbol period lies in either subset a or subset c. Furthermore, the path metric having the lowest value provides the best estimate of the current state of the encoder. That is, the lowest path metric generated by the ACS unit provides an estimate of the current state of the encoder, and allows a prediction of which subset the following symbol will lie in.

As discussed above, a sliced signal is determined for the channel equalizer 34 based upon its output as shown in FIG. 4, and a sliced signal is determined for the phase tracker 36 based upon its output as shown in FIG. 4. The slicing may be accomplished using a conventional slicer characterized by a single set of seven slice levels for slicing the eight-level symbols. The seven levels are shown in Column E of FIG. 5. Thus, a symbol having a level more positive than +6 would be fed back to the channel equalizer 34 or the phase tracker 36 as the quantized value +7, a symbol having a level between +4 and +6 would be fed back as the quantized value +5, a symbol having a level between +2 and +4 would be fed back as the quantized value +3, a symbol having a level between 0 and +2 would be fed back as the quantized value +1, a symbol having a level between 0 and +2 would be fed back as the quantized value +1, a symbol having a level between 0 and −2 would be fed back as the quantized value −1, a symbol having a level between −2 and −4 would be fed back as the quantized value −3, a symbol having a level between −4 and −6 would be fed back as the quantized value −5, and a symbol having a level below between −6 would be fed back as the quantized value −7.

While this approach is perfectly satisfactory in theory, its performance may be degraded under noisy conditions where the amplitude of the symbol level may cross a slice level solely due to noise acquired during transmission and reception. In the example discussed above, the amplitude of a symbol originally having a value of +5 may be degraded by noise such that its value at the output of the phase tracker 36, or at the output of the channel equalizer 34, is +6.1. Without noise, the +5 symbol is correctly sliced by the conventional slicer to its proper quantized value of +5. However, in the presence of noise, the +5 symbol is improperly sliced by the conventional slicer to an incorrect quantized value of +7.

Accordingly, unlike conventional slicers, the slicers of the present invention store plural sets of slice levels for the purpose explained below. One of these slicers, a slicer 78 (FIG. 4), is used in conjunction with the channel equalizer 34. The slicer 78 provides an output (through the switch 30) to both the channel equalizer 34 and a negative input of a summer 79, and receives an input not only from the output of the channel equalizer 34, but also from an ACS unit of a partial Viterbi decoder 80. (For example, the channel equalizer 34 may be of the type having a feedback filter and a training algorithm so that the output of the slicer 78 is provided to the feedback filter and the output of the summer 79 is provided to the training algorithm.) The output of the equalizer 34 is also connected to the positive input of the summer 79. Only the ACS unit and the BMG of a Viterbi decoder are required for the partial Viterbi decoder 80. Similarly, instead of a conventional slicer, a slicer 82 is used in conjunction with the phase tracker 36. The slicer 82 has a symbol input 84, which is connected to an output of the phase tracker 36, a set selecting input 86, which is connected to an ACS unit of the Viterbi decoder 40, and an output, which is connected to a negative input of a summer 87. A positive input of the summer 87 is connected to the symbol input 84. The output of the summer 87 is connected through another pole of the multiple pole switch 30 to the phase tracker 36. If the phase tracker 36 is the phase tracker disclosed in the aforementioned '587 patent, the slicer 82 would be incorporated in the mapper 34 disclosed therein. The slicers 78 and 82 are active when the comb filter 32 is not active.

The slicer 82, which is used with the summer 87, with the phase tracker 36, and with the Viterbi decoder 40, stores two sets of three slicing levels. One set of three slicing levels is illustrated in Column F of FIG. 5 and is used by the slicer 82 when the lowest value path metric supplied by the ACS unit of the Viterbi decoder 40 corresponds to an encoder state of 01 or 11. The other set of three slicing levels is illustrated in Column G of FIG. 5 and is used by the slicer 82 when the lowest value path metric supplied by the ACS unit of the Viterbi decoder 40 corresponds to an encoder state of 00 or 10.

In other words, if the lowest value path metric of the ACS unit of the Viterbi decoder 40 corresponds to an encoder state of 01 or 11, it is assumed that the multi-level symbol at the output of the phase tracker 36 belongs to either the subset a or the subset c so that only the three slice levels 88, 90, and 92 in Column F of FIG. 5 need to be used to derive the corresponding quantized level. Thus, if the multi-level symbol at the output of the phase tracker 36 and applied to the slicer 82 is more positive than +5, this multi-level symbol will be quantized to a value of +7. If the multi-level symbol is between +5 and +1, this multi-level symbol will be quantized to a +3. If the multi-level symbol is between +1 and −3, this multi-level symbol will be quantized to value of −1. If the multi-level symbol is more negative than −3, this multi-level symbol will be quantized to a value of −5.

Similarly, if the lowest path metric corresponds to an encoder state of 00 or 10, it is assumed that the multi-level symbol belongs to either subset b or subset d, so that only the three slice levels in Column G of FIG. 5 are used to derive the quantized data level to be supplied by the slicer 82 to the summer 87 as discussed above in connection with Column F. Thus, if the multi-level symbol at the output of the phase tracker 36 and applied to the slicer 82 is more positive than +3, this multi-level symbol will be quantized to a value of +5. If the multi-level symbol is between −1 and +3, this multi-level symbol will be quantized to a +1. If the multi-level symbol is between −5 and −1, this multi-level symbol will be quantized to value of −3. If the multi-level symbol is more negative than −5, this multi-level symbol will be quantized to a value of −7.

Whether using Column F or Column G, the distance between adjacent slice levels is twice that of the conventional slice levels of Column E, thereby significantly increasing the robustness of the slicing system. In the example discussed above of a nominal +5 level symbol which has been corrupted by noise to a +6.1 level symbol, the symbol will be quantized to a value of +7 instead of its correct value of +5 without the present invention. However, with the present invention, the proper result is produced because the lowest path metric produced by the ACS unit of the Viterbi decoder 40 directs use of the proper slice levels, i.e. the set of slice levels in Column G.

The summer 87 subtracts the quantized value produced by the slicer 82 from the multi-level symbol at the output of the phase tracker 36 in order to generate an error signal which is applied to appropriate elements of the phase tracker 36.

The slicer 78 associated with the equalizer 34 may operate in a manner which is similar to the slicer 82.

Figure 11:
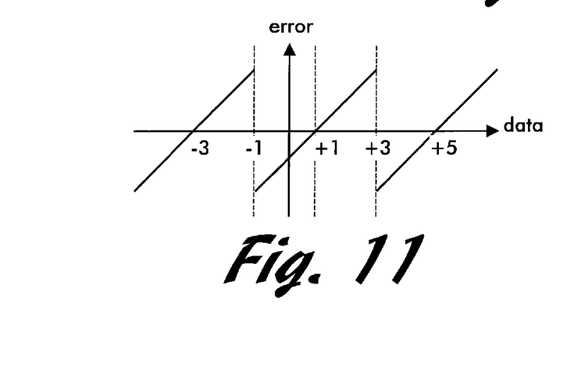
FIGS. 11–13 illustrate a refinement of the present invention.

The transfer characteristic of the operation of the slicer 82 and the summer 87 is shown in FIG. 11 which illustrates three exemplary slice values of −3, +1, and +5. If the slice value, as dictated by the lowest path metric produced by the ACS unit of the Viterbi decoder 40, and the output of the phase tracker 36 are both +5, for example, a zero error value is generated. If the slice value is +5 and the output of the phase tracker 36 is +5.5, an error value of +0.5 is generated, and so on. If the phase tracker 36 is the phase tracker disclosed in the aforementioned '587 patent, the mapper 34 disclosed in this patent uses this error value to generate its difference.

Figure 12:
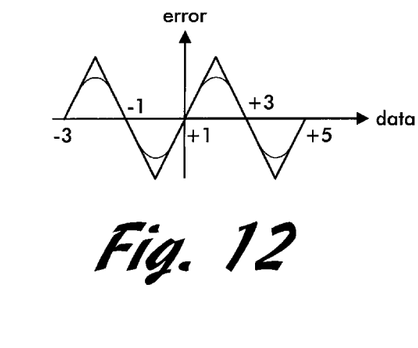

However, if data (e.g., the output of the phase tracker 36) is close to midway between two slice values (such as at about +3), such data can be incorrectly sliced because there is an uncertainty as to whether the data should be sliced to a value of +1 or +5. Incorrect slicing can result in an error and an attempted correction in the wrong direction. In such circumstances, it may be better to generate a weighted error signal so that small corrections are attempted in the region where the slice decisions are likely to be incorrect rather than possibly correcting in the wrong direction. In order to correctly generate a weighted error signal in these circumstances, the slicer 82 and summer 87 may be combined into a single error look-up table to produce any desired response, such as the response illustrated in FIG. 12. As shown in FIG. 12, an error signal of zero is generated midway between slice values. Error signals at other data values are likewise modified in accordance with the characteristic of FIG. 12.

Figure 13:
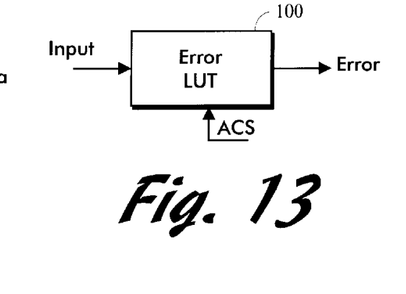

A preferred technique for implementing the characteristic of FIG. 12 is to use an error LUT 100, as shown in FIG. 13, in place of a slicer and its corresponding summer. The error LUT 100 stores multiple look-up tables in which the active look-up table is selected in response to the lowest path metric produced by the ACS unit of the Viterbi decoder 40. Thus, each value of the input data addresses a memory location in the selected look-up table, and the error stored at that memory location is read out as the corresponding error signal.

The above description of the slicer 82, which operates in conjunction with the Viterbi decoder 40, applies to the case where data processing is performed along the second signal processing path of the receiver 26, i.e. where the comb filter 32 is not used to process data. However, in the case where data processing is performed along the first signal processing path of the receiver 26, i.e. where the comb filter 32 is used to process data, a slicer 82' having a set selecting input connected to the ACS unit of the Viterbi decoder 35 is used instead of the slicer 82. When the multiple pole switch 30 is operated so that data is processed along the first signal processing path, the slicer 82' is active. The output of the slicer 82' is connected to a summer 83, which operates in a manner similar to the summer 87. Similarly, the output of a slicer 78' is connected to a summer similar to the summer 87, and a partial Viterbi decoder 94, similar to the partial Viterbi decoder 80, is used in conjunction with the slicer 78'.

Although the comb filter 32 has the desired effect of reducing NTSC channel interference, the comb filter 32 also increases the complexity of the receiver's Viterbi decoders. That is, an optimum Viterbi decoder must take into account not only the state of the trellis encoder 52, but also the state of the delay element of the comb filter 32. Because there are four encoder states for the trellis encoder 52, and four possible states of the delay element of the comb filter 32, an optimum Viterbi decoder must process a sixteen-state trellis. The aforementioned 181 application illustrates a technique for reducing the complexity of a Viterbi decoder which is to be used in conjunction with a comb filter. Such a reduced complexity Viterbi decoder may be used for the Viterbi decoder 35 and the partial Viterbi decoder 94.

Each of the BMGs of the Viterbi decoder 38 and the partial Viterbi decoder 94 generate seven branch metrics. Each of the seven branch metrics represents the squared Euclidean distance between the symbol level at the output of the comb filter 32 and the nearest one of three values of each of seven co-sets A, B1, B2, C1, C2, D1, and D2. These co-sets, and the three values for each co-set (shown as black dots), are illustrated in FIG. 8 hereof.

Figure 8:
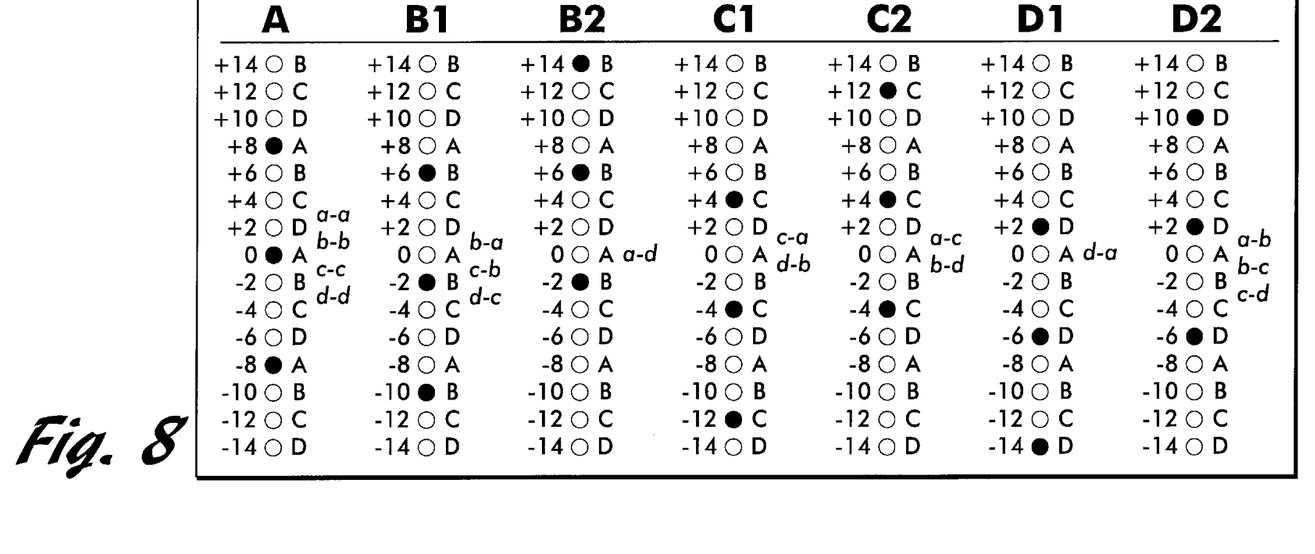
FIG. 8 illustrates seven unique co-sets which characterize the output of a comb filter when used in conjunction with a multi-level symbol data transmission and reception system.
Figure 9:
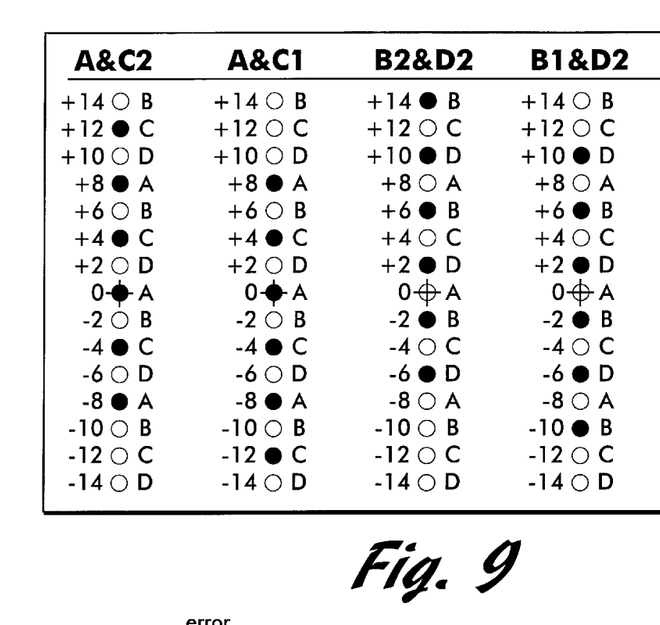
FIG. 9 illustrates five sets of slice values for the slicer shown in FIG. 4 in the case where a comb filter is used in the receiver of a multi-level symbol data transmission and reception system.

These co-sets illustrated in FIG. 8 may be rearranged as shown in FIG. 9 according to the following explanation. When the trellis encoder 52 is in a particular state, its output can lie in only two of the four subsets as illustrated in FIG. 7. For example, when the trellis encoder 52 lies in state 00, the next symbol must reside in either the subset b or d. The current estimate of the state of the trellis encoder 52 of the Viterbi decoder 40 can be used to predict in which of these two subsets the next symbol can lie. Hence, the slicer 82 can quantize the signal to one of four amplitudes that make up subset b and/or subset d.

Figure 14:
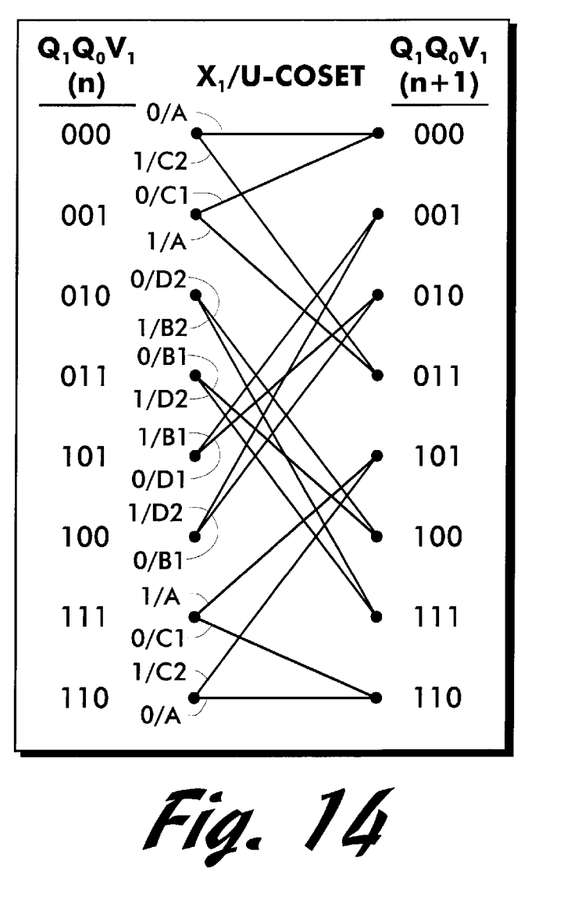
FIG. 14 is a trellis diagram similar to the trellis diagram illustrated in FIG. 7 but for the case where a trellis encoder and a comb filter are used in combination.

A similar procedure occurs when the comb filter 32 is active. It can be shown from FIG. 14 that, when the combination of the trellis encoder 52 and the comb filter 32 is in a particular state, the output of the comb filter 32 will lie in one of only two of the seven subsets illustrated in FIG. 8. (FIG. 14 is reproduced from the aforementioned 181 application and is a trellis diagram for the case where the comb filter 32 is active.) Thus, (i) when the combined state of the trellis encoder 52 and the comb filter 32 is state 0, the next symbol must lie in either subset A or subset C2, (ii) when the combined state of the trellis encoder 52 and the comb filter 32 is state 1, the next symbol must lie in either subset A or subset C1, (iii) when the combined state of the trellis encoder 52 and the comb filter 32 is state 2, the next symbol must lie in either subset B2 or subset D2, (iv) when the combined state of the trellis encoder 52 and the comb filter 32 is state 3, the next symbol must lie in either subset B1 or subset D2, (v) when the combined state of the trellis encoder 52 and the comb filter 32 is state 4, the next symbol must lie in either subset B1 or subset D1, (vi) when the combined state of the trellis encoder 52 and the comb filter 32 is state 5, the next symbol must lie in either subset B1 or subset D2, (vii) when the combined state of the trellis encoder 52 and the comb filter 32 is state 6, the next symbol must lie in either subset A or subset C1, and (viii) when the combined state of the trellis encoder 52 and the comb filter 32 is state 7, the next symbol must lie in either subset A or subset C2.

It is noted that the output co-sets (A and C2) of transitions (i) and (viii) are the same, that the output co-sets of transitions (ii) and (vii) are the same, and that the output co-sets of transitions (iv) and (vi) are the same. Consequently, these seven co-sets may be rearranged into five groups of two co-sets each such that, for a particular state of the trellis encoder 20/comb filter 32 combination, the output of the comb filter 32 must lie within one of these five groups. The state of the trellis encoder 52 and the comb filter 32 as estimated by the Viterbi decoder 35 can be used to predict in which of these five groups the next symbol can lie.

These five groups are shown in FIG. 9. Each group has five slice levels. The five slice levels of the group A and C2 is shown in FIG. 9. Similarly, the group A and C1 has slice levels at +6, +2, −2, −6, and −10, the group B2 and D2 has slice levels at +12, +8, +4, 0, and −4, the group B1 and D2 has slice levels at +8, +4, 0, −4, and −8, and the group B1 and D1 has slice levels at +4, 0, −4, −8, and −12. Accordingly, the lowest path metric produced by the ACS unit of the Viterbi decoder 35 selects the slice levels of one of the five groups illustrated in FIG. 9. The selected set of slice levels is then used by the slicer 82' for slicing the output of the phase tracker 36 to produce a quantized value for supply to the summer 83 or by the slicer 78' for slicing the output of the equalizer 34.

Figure 10:
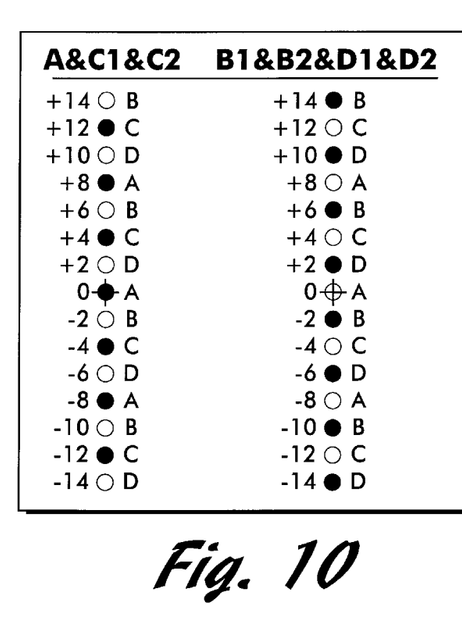
FIG. 10 illustrates an alternative two sets of slice values for the slicer shown in FIG. 4 in the case where a comb filter is used in the receiver of a multi-level symbol data transmission and reception system.

The five sets of slice levels shown in FIG. 9 can be reorganized into two sets of slice values as shown in FIG. 10. These two sets of slice levels shown in FIG. 10 are somewhat less robust than the five sets illustrated in FIG. 9, but these two sets result in a less complicated selection process. The first set of slice values, A, C1, and C2, has six slice levels, and the second set of slice values, B1, B2, D1, and D2, has seven slice levels. The slicers 78' and 82' store the seven groups of slice levels shown in FIG. 8, the five groups of slice levels shown in FIG. 9, or the two groups of slice levels shown in FIG. 10, as appropriate.

With these stored slice levels, the slicer 82' then responds to the lowest path metric from the ACS unit of the Viterbi decoder 35 in the same manner as the slicer 82 responds to the ACS unit of the Viterbi decoder 40, and the slicer 78' responds to the lowest path metric from the ACS unit of the partial Viterbi decoder 94 in the same manner as the slicer 82 responds to the ACS unit of the Viterbi decoder 40. Similarly, the slicer 78 responds to the lowest path metric from the ACS unit of the partial Viterbi 80 in the same manner as the slicer 82 responds to the ACS unit of the Viterbi decoder 40.

Certain modifications of the present invention have been discussed above. Other modifications will occur to those practicing in the art of the present invention. The trellis encoder 52, for instance, may take various other forms than that shown in FIG. 3 without departing from the invention. For example, the number of encoder states may differ from that shown, feedforward architectures may be used rather than the disclosed feedback structure, and non-systematic coding may be employed in either a feedback or a feedforward arrangement.

Also, modulation and demodulation techniques other than VSB, such as those employing, for example, quadrature amplitude modulation (QAM) and demodulation, may be employed.

Additionally, the present invention has been described in connection with eight-level symbols, although it should be understood that the present invention may be used with symbols having any number of levels.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A data processor comprising:
   receiving means for receiving a plurality of multi-level symbols;
   selecting means for selecting one of a plurality of sets of slice values based upon the multi-level symbols, wherein each set of slice values has a minimum of three slice values; and,
   slicing means responsive to the selected set of slice values for slicing and decoding the multi-level symbols.

2. The data processor of claim 1 wherein each of the sets of slice values has a number of slice values, wherein the multi-level symbols are characterized by a number of values, and wherein the number of slice values of each of the sets of slice values is less than one-half of the number of values characterizing the multi-level symbols.

3. The data processor of claim 1 wherein adjacent slice values of each of the sets of slice values are spaced apart from each other, and wherein the slice values of one of the sets of slice values are offset from the slice values of another one of the sets of slice values.

4. The data processor of claim 1 wherein adjacent slice values of each of the sets of slice values are spaced apart from each other by a substantially equal amount, and wherein the slice values of one of the sets of slice values are offset by a substantially equal amount from the corresponding slice values of another one of the sets of slice values.

5. The data processor of claim 1 wherein the selecting means comprises means for selecting one of only two sets of slice values, and wherein each of the only two sets of slice values contains only three slice values.

6. The data processor of claim 5 wherein adjacent slice values of each of the only two sets of slice values are spaced apart from each other by a substantially equal amount, and wherein the slice values of one of the only two sets of slice values are offset by a substantially equal amount from the corresponding slice values of the other of the only two sets of slice values.

7. The data processor of claim 6 wherein the plurality of multi-level symbols comprises a plurality of eight-level symbols, and wherein the selecting means comprises means responsive to each multi-level symbol for calculating four path metrics.

8. The data processor of claim 1 wherein the selecting means comprises means for selecting one of only two sets of slice values, and wherein each of the only two sets of slice values contains a minimum of six slice values.

9. The data processor of claim 8 wherein adjacent slice values of each of the only two sets of slice values are spaced apart from each other by a substantially equal amount, and wherein the slice values of one of the only two sets of slice values are offset by a substantially equal amount from the corresponding slice values of the other of the only two sets of slice values.

10. The data processor of claim 9 wherein the plurality of multi-level symbols comprises a plurality of eight-level symbols, and wherein the selecting means comprises means responsive to each multi-level symbol for calculating seven path metrics.

11. The data processor of claim 1 wherein the selecting means comprises means for selecting one of only five sets of slice values, and wherein each of the only five sets of slice values contains a minimum of five slice values.

12. The data processor of claim 11 wherein adjacent slice values of each of the only five sets of slice values are spaced apart from each other by a substantially equal amount, and wherein the slice values of one of the only five sets of slice values are offset by a substantially equal amount from the corresponding slice values of another one of the only five sets of slice values.

13. The data processor of claim 12 wherein the plurality of multi-level symbols comprises a plurality of eight-level symbols, and wherein the selecting means comprises means responsive to each multi-level symbol for calculating seven path metrics.

14. A data processor comprising:
    a receiver, wherein the receiver is arranged to receive a plurality of multi-level symbols;
    a selector, wherein the selector is arranged to select one of only two sets of slice values, wherein each of the only two sets of slice values has a plurality of slice values; and,
    a slicer, wherein the slicer is responsive to the selected set of slice values and is arranged to slice and decode the multi-level symbols.

15. The data processor of claim 14 wherein each of the only two sets of slice values has a number of slice values, wherein the multi-level symbols are characterized by a number of values, and wherein the number of slice values of each of the only two sets of slice values is less than one-half of the number of values characterizing the multi-level symbols.

16. The data processor of claim 14 wherein adjacent slice values of each of the only two sets of slice values are spaced apart from each other, and wherein the slice values of one of the only two sets of slice values are offset from the slice values of the other of the only two sets of slice values.

17. The data processor of claim 14 wherein adjacent slice values of each of the only two sets of slice values are spaced apart from each other by a substantially equal amount, and wherein the slice values of one of the only two sets of slice values are offset by a substantially equal amount from the corresponding slice values of the other of the only two sets of slice values.

18. The data processor of claim 14 wherein each of the only two sets of slice values contains only three slice values.

19. The data processor of claim 18 wherein adjacent slice values of each of the only two sets of slice values are spaced apart from each other by a substantially equal amount, and wherein the slice values of one of the only two sets of slice values are offset by a substantially equal amount from the corresponding slice values of the other of the only two sets of slice values.

20. The data processor of claim 19 wherein the plurality of multi-level symbols comprises a plurality of eight-level symbols, and wherein the selector is responsive to each multi-level symbol in order to calculate four path metrics.

21. The data processor of claim 14 wherein each of the only two sets of slice values contain a minimum of six slice values.

22. The data processor of claim 21 wherein adjacent slice values of each of the only two sets of slice values are spaced apart from each other by a substantially equal amount, and wherein the slice values of one of the only two sets of slice values are offset by a substantially equal amount from the corresponding slice values of the other of the only two sets of slice values.

23. The data processor of claim 22 wherein the plurality of multi-level symbols comprises a plurality of eight-level symbols, and wherein the selector is responsive to each multi-level symbol in order to calculate seven path metrics.

24. A data processor comprising:
    receiving means for receiving a plurality of multi-level symbols;
    selecting means for selecting one of only five sets of slice values, wherein each of the only five sets of slice values has a plurality of slice values; and,
    slicing means responsive to the selected set of slice values for slicing and decoding the multi-level symbols.

25. The data processor of claim 24 wherein each of the only five sets of slice values has a number of slice values, wherein the multi-level symbols are characterized by a number of values, and wherein the number of slice values of each of the only five sets of slice values is less than one-half of the number of values characterizing the multi-level symbols.

26. The data processor of claim 24 wherein adjacent slice values of each of the only five sets of slice values are spaced apart from each other, and wherein the slice values of one of the only five sets of slice values are offset from the slice values of another one of the only five sets of slice values.

27. The data processor of claim 24 wherein adjacent slice values of each of the only five sets of slice values are spaced apart from each other by a substantially equal amount, and wherein the slice values of one of the only five sets of slice values are offset by a substantially equal amount from the corresponding slice values of another one of the only five sets of slice values.

28. The data processor of claim 24 wherein each of the only five sets of slice values contains only five slice values.

29. The data processor of claim 28 wherein adjacent slice values of each of the only five sets of slice values are spaced apart from each other by a substantially equal amount, and wherein the slice values of one of the only five sets of slice values are offset by a substantially equal amount from the corresponding slice values of another one of the only five sets of slice values.

30. The data processor of claim 29 wherein the plurality of multi-level symbols comprises a plurality of eight-level symbols, and wherein the selector is responsive to each multi-level symbol for calculating seven path metrics.

31. A data processor comprising:
    developing means for developing a data signal including a plurality of multi-level symbols;
    determining means responsive to each of the multi-level symbols for determining the lowest path metric characterizing the data signal;
    selecting means for selecting one of a plurality of sets of slice values in response to the lowest path metric; and,
    slicing means responsive to the selected set of slice values for slicing and decoding the multi-level symbols.

32. The data processor of claim 31 wherein each of the sets of slice values has a number of slice values, wherein the multi-level symbols are characterized by a number of values, and wherein the number of slice values of each of the sets of slice values is less than one-half of the number of values characterizing the multi-level symbols.

33. The data processor of claim 31 wherein adjacent slice values of each of the sets of slice values are spaced apart from each other, and wherein the slice values of one of the sets of slice values are offset from the slice values of another one of the sets of slice values.

34. The data processor of claim 31 wherein adjacent slice values of each of the sets of slice values are spaced apart from each other by a substantially equal amount, and wherein the slice values of one of the sets of slice values are offset by a substantially equal amount from the corresponding slice values of another one of the sets of slice values.

35. The data processor of claim 31 wherein the data signal comprises a plurality of eight-level symbols encoded by a four-state encoder, and wherein the determining means comprises means responsive to each symbol for calculating four path metrics each corresponding to a respective state of the encoder.

36. The data processor of claim 35 wherein the four-state encoder is a convolutional encoder.

37. The data processor of claim 36 wherein the selecting means comprises means for selecting one of two sets of slice values, each of the sets of slice values containing three slice values.

38. A data processor comprising:

a receiver arranged to receive a plurality of multi-level symbols;

a selector arranged to select one of a plurality of sets of slice values, wherein each set of slice values has a minimum of three slice values; and, a slicer having a symbol input, a selector input, and an output, wherein the slicer stores the plurality of sets of slice values, wherein the symbol input is coupled to receive the multi-level symbols from the receiver, wherein the selector input is coupled to the selector, and wherein the slicer is arranged to slice and decode the multi-level symbols dependent upon the set of slice values selected by the selector and to provide the sliced multi-level symbols at the output.

* * * * *